(12) United States Patent
Tanaka et al.

(10) Patent No.: US 11,139,895 B2
(45) Date of Patent: Oct. 5, 2021

(54) TRANSMISSION DEVICE, OPTICAL TRANSCEIVER MODULE, AND OPTICAL MODULATION METHOD

(71) Applicant: FUJITSU LIMITED, Kawasaki (JP)

(72) Inventors: Shinsuke Tanaka, Hiratsuka (JP); Yohei Sobu, Chiyoda (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/074,707

(22) Filed: Oct. 20, 2020

(65) Prior Publication Data

US 2021/0135761 A1 May 6, 2021

(30) Foreign Application Priority Data

Oct. 31, 2019 (JP) .............................. JP2019-198574

(51) Int. Cl.
*H04B 10/548* (2013.01)
*H04B 10/40* (2013.01)
(Continued)

(52) U.S. Cl.
CPC ........... *H04B 10/548* (2013.01); *G02F 1/225* (2013.01); *H04B 10/40* (2013.01); *G02F 1/212* (2021.01)

(58) Field of Classification Search
CPC ....... H04B 10/548; H04B 10/40; G02F 1/212; G02F 1/225
(Continued)

(56) References Cited

U.S. PATENT DOCUMENTS

2008/0095486 A1* 4/2008 Shastri .................. G02F 1/0123
385/3
2011/0044573 A1* 2/2011 Webster ............... H04B 10/516
385/3
(Continued)

FOREIGN PATENT DOCUMENTS

WO 2011/043079 A1 4/2011
WO 2013/042753 A1 3/2013

OTHER PUBLICATIONS

Tomoyuki Yamase et al., "Low-power Multi-level Modulation of InP MZ Modulator with Linear Accelerator Type Tiny In-line Centipede Electrode Structure Directly Driven with 65-nm CMOS-IC", The Institute of Electronics Information and Communication Engineers (IEICE) Technical Report OPE2013-12 LQE2013-22, pp. 27-32, Jun. 2013 (Total 18 pages).

(Continued)

*Primary Examiner* — Dalzid E Singh
(74) *Attorney, Agent, or Firm* — Fujitsu Patent Center

(57) ABSTRACT

A transmission device including a multi-division optical modulator having a plurality of modulation segments, the transmission device includes a driver circuit configured to output binary data for each bit based on an input electrical signal, and an optical modulator configured to have a multilevel modulation segment driven by a first drive signal including two or more bit signal from the driver circuit, and plural binary modulation segments driven by second drive signal including only one bit signal from the driver circuit, wherein the multilevel modulation segment incudes a first phase shifter disposed on each arm of the optical modulator, the binary modulation segment includes a plurality of second phase shifters arranged along each arm of the optical modulator, and lengths of the second phase shifters are all (Continued)

the same and are shorter than a length of the first phase shifter.

16 Claims, 14 Drawing Sheets

(51) Int. Cl.
*G02F 1/225* (2006.01)
*G02F 1/21* (2006.01)

(58) Field of Classification Search
USPC .......................................................... 398/188
See application file for complete search history.

(56) References Cited

U.S. PATENT DOCUMENTS

| | | | |
|---|---|---|---|
| 2011/0222813 A1* | 9/2011 | Webster | G02F 1/025 385/3 |
| 2012/0251032 A1 | 10/2012 | Kato | |
| 2014/0233962 A1 | 8/2014 | Kato | |
| 2018/0205465 A1* | 7/2018 | Tanaka | G02F 1/025 |
| 2018/0341164 A1* | 11/2018 | Williams | G02F 1/2255 |

OTHER PUBLICATIONS

Tomoyuki Yamase et al., "Low-Power Multi-level Modulation of InP MZM with In-line Centipede Structure Directly Driven by CMOS IC", 2013 18th OptoElectronics and Communications Conference held jointly with 2013 International Conference on Photonics in Switching (OECC/PS) WK2-3, 2013 IEICE (Total 2 pages).

\* cited by examiner

TRANSMISSION DEVICE, OPTICAL TRANSCEIVER MODULE, AND OPTICAL MODULATION METHOD

CROSS-REFERENCE TO RELATED APPLICATION

This application is based upon and claims the benefit of priority of the prior Japanese Patent Application No. 2019-198574, filed on Oct. 31, 2019, the entire contents of which are incorporated herein by reference.

FIELD

The embodiments discussed herein are related to a transmission device, an optical transceiver module, and an optical modulation method.

BACKGROUND

In order to increase the communication capacity, multi-level modulation is performed which generates two bits or more of information by one modulation. With the spread of digital coherent transmission and reception, digital signal processing such as mapping of a bit string to a signal point, waveform shaping, and pre-equalization is performed on the transmission side.

In a common optical transmitter, a digital signal that is output from a digital signal processor (DSP) is converted into an electrical analog signal by a digital-to-analog converter (DAC), and the electrical analog signal is amplified by an analog driver to generate a drive signal having an amplitude of several volts. By driving an optical modulator with the drive signal, a modulated optical signal is output.

On the other hand, an optical modulation module that generates a multilevel optical modulation signal only by inputting a digital signal has been proposed (for example, see Japanese National Re-publication of International Patent Application No. 2011-043079 and Japanese National Re-publication of International Patent Application No. 2013-042753). FIG. 1 illustrates a configuration example in which an optical modulator is driven by a digital driver. The digital driver generates a drive signal having a low amplitude (for example, an amplitude voltage less than 1 V) for each bit from the digital signal output from the DSP. For each configuration bit, the low-amplitude drive signal is applied to divided segments (seg. 1 to seg. m) of the optical modulator to output an optical signal.

A configuration of FIG. 1 is referred to as an "optical DAC" configuration since light is modulated at the output of the digital driver on a bit-by-bit basis without performing the digital-to-analog conversion in an electrical domain. In the optical DAC configuration, the optical signal modulated by the low-amplitude digital driver is obtained. The electric DAC is not desired, and the power consumption of the entire optical transmitter may be reduced. However, as the number of bits increases, the number of electrode segments increases by a power of 2.

As illustrated in FIG. 2, a hybrid configuration has been proposed in which some of the divided electrode segments are driven by the digital driver to generate m bits, and each of the remaining n bits is driven by a binary thermometer code (for example, see Tomoyuki Yamase et al., "Low-power multi-level modulation of InP MZ modulator with linear accelerator type tiny in-line centipede electrode structure directly driven with 65-nm CMOS-IC", Technical Report OPE 2013-12 LQE 2013-22 (2013-6) and Tomoyuki Yamase et al., "Low-Power Multi-level Modulation of InP MZM with In-line Centipede Structure Directly Driven by CMOS IC", OECC/PS, WK2-3, 2013).

SUMMARY

According to an aspect of the embodiments, a transmission device including a multi-division optical modulator having a plurality of modulation segments, the transmission device includes a driver circuit configured to output binary data for each bit based on an input electrical signal, and an optical modulator configured to have a multilevel modulation segment driven by a first drive signal including two or more bit signals from the driver circuit, and plural binary modulation segments driven by a second drive signal including only one bit signal from the driver circuit, wherein the multilevel modulation segment includes a first phase shifter disposed on each arm of the optical modulator, the binary modulation segment includes a plurality of second phase shifters arranged along each arm of the optical modulator, and lengths of the second phase shifters are all the same and are shorter than a length of the first phase shifter.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
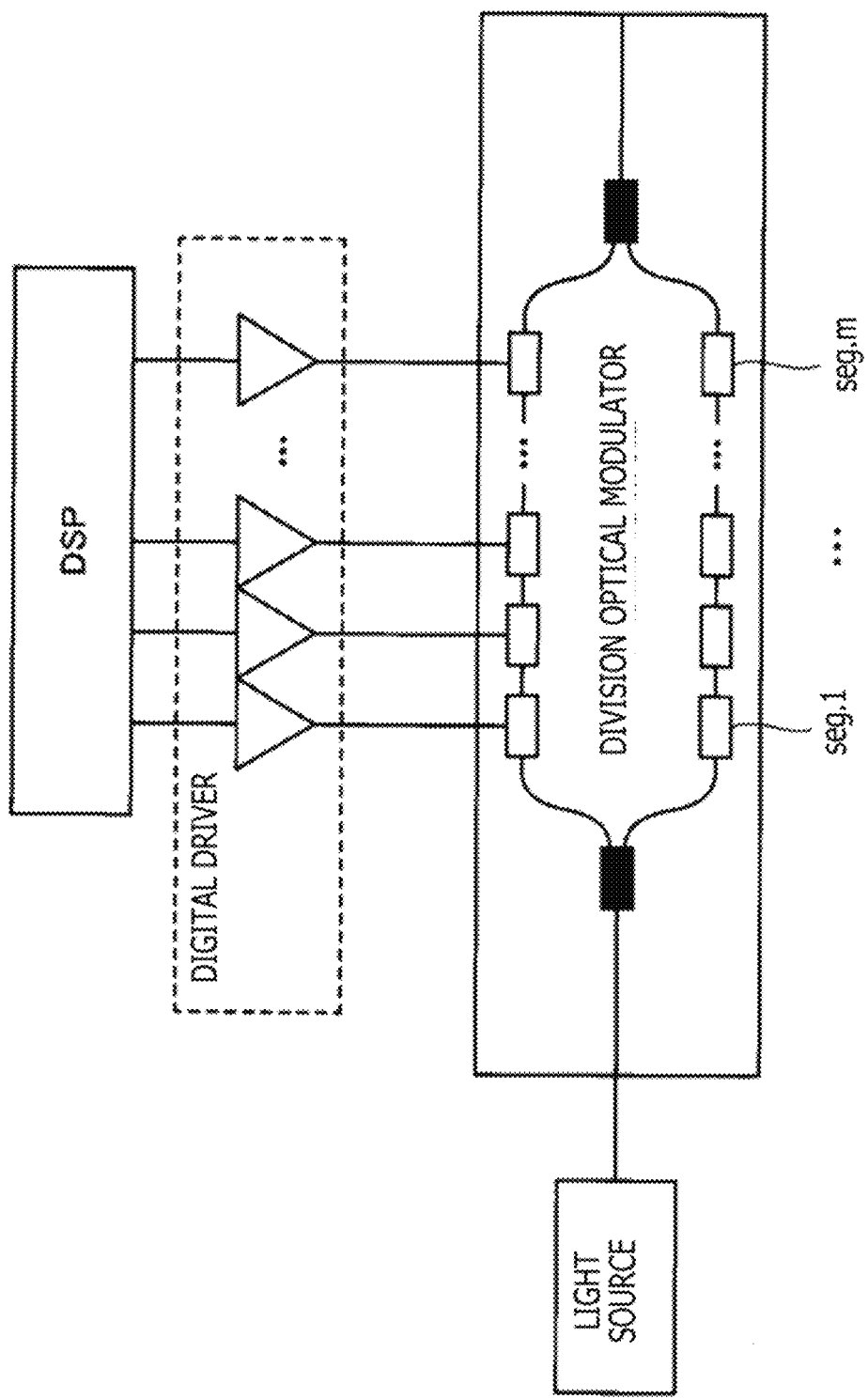
FIG. 1 is a schematic view illustrating a widely-known configuration that drives an optical modulator with a digital driver.
Figure 2:
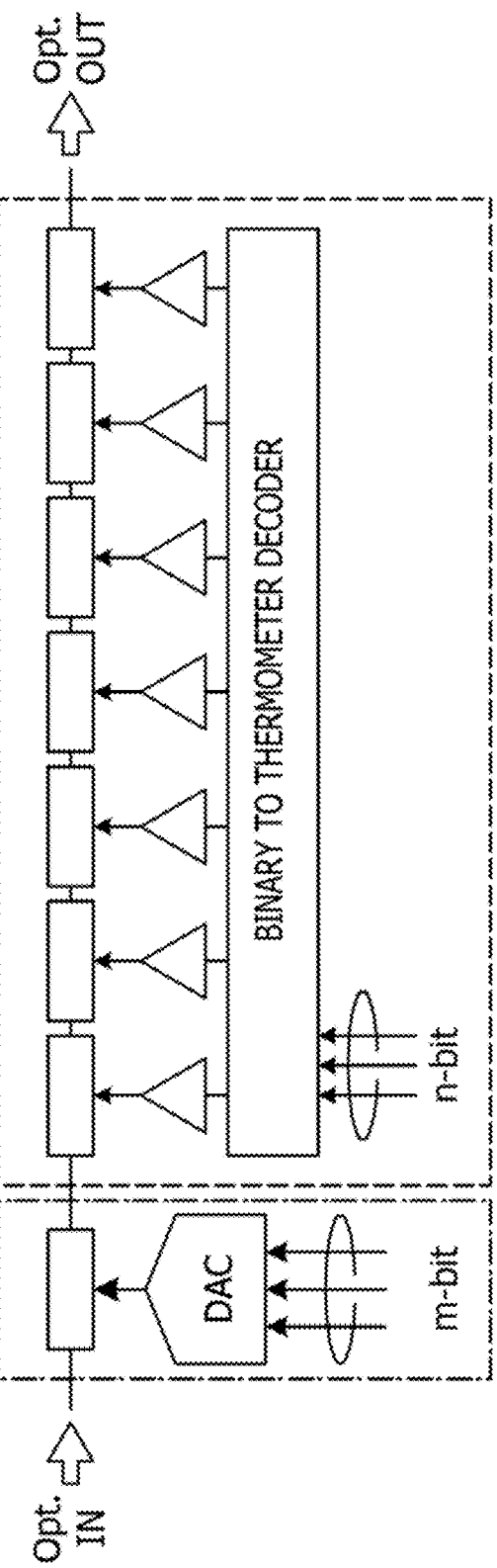
FIG. 2 is a schematic view illustrating a widely-known hybrid optical modulation.

In the related art, in the configuration of FIG. 2, different drive circuit configurations are used in a region where multi-level modulation is performed with m bits and a region where each bit of n bits is subjected to binary modulation, and a uniform modulation bandwidth (analog operating bandwidth) cannot be obtained. Therefore, the operation bandwidth differs between the multi-valued modulation area and the binary modulation area for each bit, and the waveform or eye pattern of the output light deteriorates.

An object of one aspect of the present invention is to provide an optical transmitter in which an operating bandwidth is made uniform between a multi-value modulated segment and a bit-wise binary modulated segment.

Figure 3:
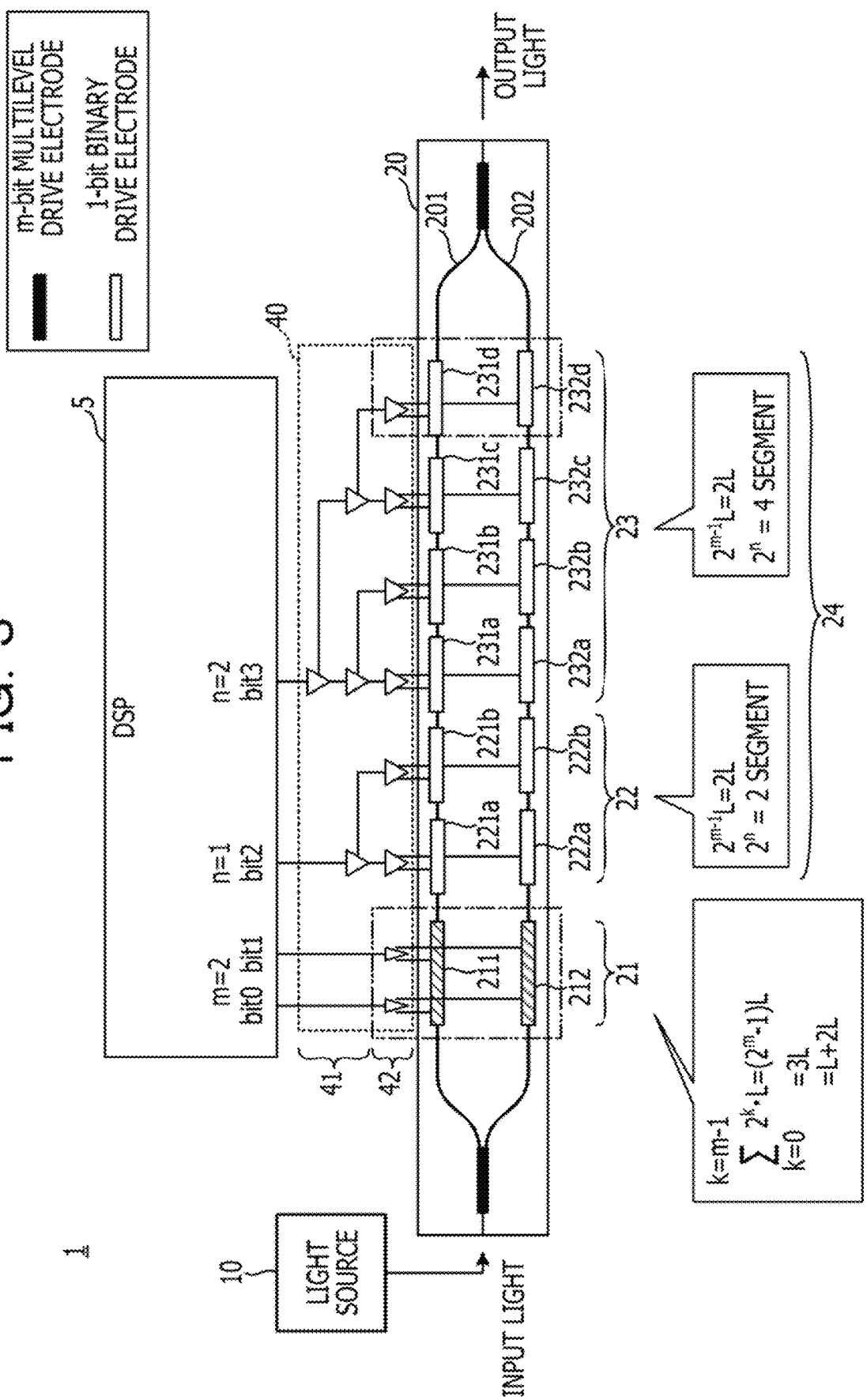
FIG. 3 is a schematic view illustrating an optical transmitter according to an embodiment.

FIG. 3 is a schematic view illustrating an optical transmitter 1 according to an embodiment. In the embodiment, in an optical modulator provided with a multilevel modulation segment and a binary modulation segment which is binary-modulated for each bit, a modulation bandwidth, for example, an operation bandwidth, is uniformized between the segments. To achieve this, the length and the number of phase shifters in both segments are optimized based on the same reference. A driver configuration at a final stage for driving each phase shifter is made common to optimize the driver output impedance.

The optical transmitter 1 includes a driver circuit 40 and an optical modulator 20. The optical transmitter 1 may incorporate a light source 10 or may use an external light source 10. The optical transmitter 1 may incorporate a Digital Signal Processor (DSP) 5 or may use an external DSP 5. The DSP 5 generates and outputs a digital electrical signal according to a logical value of an input transmission bit string.

The driver circuit 40 drives the optical modulator 20 according to an output signal of the DSP 5. The driver circuit 40 includes a pre-driver 41 and a final driver 42, the final driver 42 is coupled to an input of the optical modulator 20 and outputs a drive signal of the final stage.

The optical modulator 20 is a Mach-Zehnder (MZ) type optical modulator, and interaction portions where light and electricity interact with each other are formed in two optical waveguides 201 and 202. The optical modulator 20 may be a modulator using an electro-optic effect such as an LN modulator or may be a semiconductor optical modulator using a carrier plasma effect or an electric field absorption effect.

The optical modulator 20 has a multilevel modulation segment 21 which is multilevel-modulated with 2 or more bits and a binary modulation segment 24 which is binary-modulated for each one bit. The binary modulation segment 24 has sub-segments 22 and 23 depending on the number of binary-modulated bits. In an example of FIG. 3, the number m of multilevel modulation bits is two (m=2), the number n of binary modulation bits is two (n=2), and an optical signal of four bits per one symbol is transmitted.

The multilevel modulation segment 21 is driven by a four-level electrical signal of bit 0 and bit 1. The sub-segment 22 of the binary modulation segment 24 is driven by an electrical signal of bit 2, and the sub-segment 23 is individually driven by an electrical signal of bit 3.

The lengths of one-bit binary drive electrodes serving as the phase shifter provided in the binary modulation segment 24 are all equal to each other and are shorter than the lengths of the multilevel drive electrodes serving as the phase shifter provided in the multilevel modulation segment 21.

In FIG. 3, all the phase shifters 221a, 221b, 222a, 222b, 231a to 231d, and 232a to 232d provided in the binary modulation segment 24 have the same length. The length of the phase shifters 211 and 212 provided in the multilevel modulation segment 21 is longer than the length of each phase shifter in the binary modulation segment 24.

When the unit length of the phase shifter is L, if m=2 and n=2 as illustrated in FIG. 3, the length of the phase shifters 211 and 212 of the multilevel modulation segment 21 is 3L, and the length of each phase shifter of the binary modulation segment 24 is 2L.

In the sub-segment 22 of the binary modulation segment 24 that is driven by bit 2, two phase shifters having the length of 2L are arranged in columns along each of the optical waveguides 201 and 202. In the sub-segment 23 driven by bit 3, four phase shifters having the length of 2L are arranged in columns along each of the optical waveguides 201 and 202.

The length of the phase shifter of the multilevel modulation segment 21 is represented by the sum of $2^k \times L$ (k is an integer of 0 to m−1) using the unit length L and the value of m. When k is an integer of 0 to m−1, the value of the sum is $(2^m-1)L$. In a configuration example of FIG. 3, since m=2, the length of the phase shifters 211 and 212 functioning as phase shifters is $(2^2-1)L=3L$.

The length of each of the phase shifters of the binary modulation segment 24 is represented by $2^{m-1} \times L$ using the unit length of L and the value of m. In the configuration example of FIG. 3, since m=2, the length of each phase shifter of the binary modulation segment 24 is $2^{2-1} \times L=2L$.

The number of phase shifters (the number of segments) included in each of the sub-segment 22 and the sub-segment 23 of the binary modulation segment 24 is represented by $2^n$ using an n-bit bit number (n is a natural number of 1 or more) or a sub-segment number. In the configuration example of FIG. 3, in the first sub-segment 22, the bit number of the lowermost bit is n=1, and the number of segments is $2^1=2$. In each of the optical waveguides 201 and 202, two phase shifters each having a length of 2L are arranged in a column.

In the second sub-segment 23, the bit number of the uppermost bit is n=2, and the number of segments is $2^2=4$. Therefore, in each of the optical waveguides 201 and 202, four phase shifters having the length of 2L are arranged in a column.

To generalize this, in the binary modulation segment 24 driven by n (n=1, 2, . . . i, . . . , n) one-bit drive signals, the number of phase shifters included in the ith sub-segment is represented by $2^i$.

Due to the arrangement of the phase shifters, in the multilevel modulation segment 21 and the binary modulation segment 24, the lengths of the phase shifters are optimized.

Figure 4:
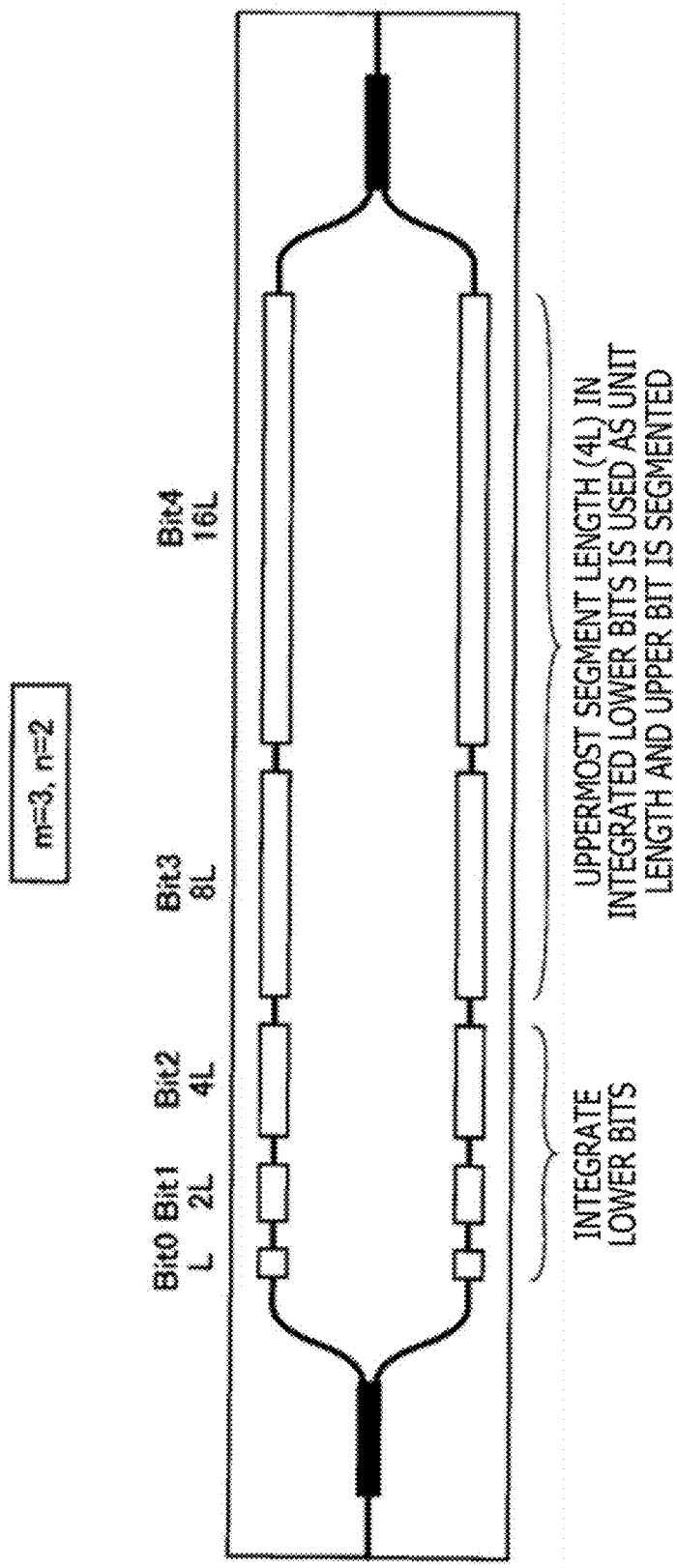
FIG. 4 is a configuration of a phase shifter on the assumption that a configuration of the embodiment is reached.

FIG. 4 is a configuration of a phase shifter assumed in a process in which the configuration of the embodiment is reached and is a diagram that serves as a basis for the length and the number of phase shifters in each segment of the embodiment.

For example, a case where m=3 and n=2 and all five bits are binary-driven for each one bit is considered. The phase shifters corresponding to the respective bits from the lowermost bit 0 to the uppermost bit 4 are weighted by a power of 2 such that the phase shift amount increases as the bit becomes higher.

In this state, it is considered that lower 3 bits (bit 0 to bit 2) are integrated into one segment. In this case, the total length of the phase shifters of the integrated segment is L+2L+4L=L. This is a basis for the phase shifter length represented by the sum Σ in each arm of the multilevel modulation segment 21 of FIG. 3.

Next, the segment length of the portion corresponding to the uppermost bit of the integrated lower bits is set as a reference length, and the length of the remaining binary drive segment is considered. The length 4L of the segment of bit 2 is set as a reference length for the remaining binary drive segments. The length of the binary segment of bit 3 is 8L, which is 2 times the reference length, and the length of the binary segment of the bit 4 is 16L, which is 4 times the reference length. The lengths of 2 times and 4 times the reference length are a basis for the number of segments in the binary modulation segment of FIG. 3.

In an example of FIG. 3, since m=2, the segment length of the uppermost bit among the integrated lower bits is 2L. Therefore, in each of the binary modulation segments, the segment length and the number of segments are set to 2L×2 and 2L×4, respectively.

In FIG. 4, m=3, and the segment length of the uppermost bit of the integrated lower bits is 4L. The binary segment of the bit 3 is 4L×2, and the binary segment of bit 4 is 4L×4.

In the multilevel modulation segment and the binary modulation segment for each bit, the phase shifter length is weighted according to the bit on the same reference, and the operation bandwidth may be uniformized between the multilevel modulation segment and the binary modulation segment.

In each segment of the binary modulation segment, by using the phase shifter divided in the same length, the operation bandwidth of the entire optical modulator may increase and a high-speed operation may be performed.

Figure 5:
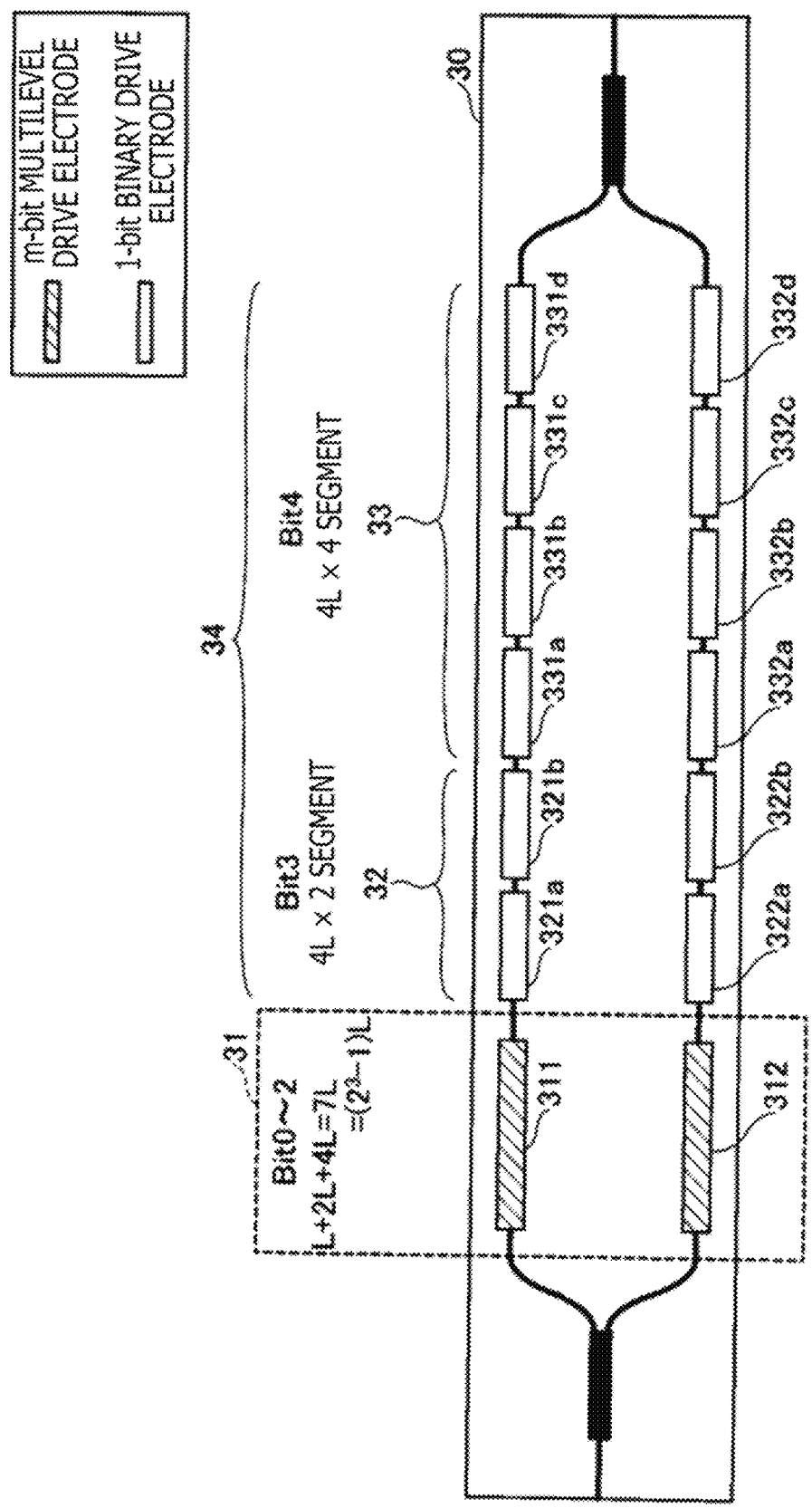
FIG. 5 is a schematic view illustrating an optical modulator when m=3 and n=2.

Similar to FIG. 4, FIG. 5 illustrates a configuration in which hybrid optical modulation with m=3 and n=2 is realized by the multilevel modulation segment and the binary modulation segment.

The optical modulator 30 includes a multilevel modulation segment 31 in which bit 0 to bit 2 are integrated and a binary modulation segment 34 that performs binary modulation on each of the bit 3 and bit 4.

In the multilevel modulation segment 31, the length of each of phase shifters 311 and 312 is set to $(2^3-1)L=7L$. As described in FIG. 4, the basis for this is the sum of the phase shifter lengths obtained by weighting the unit length L in the bit order.

In the sub-segment 32 of the binary modulation segment 34, two phase shifters are provided in each arm based on the length 4L of the phase shifter corresponding to the uppermost bit when the multilevel modulation segment 31 is decomposed as illustrated in FIG. 4. The lengths of phase shifters 321*a* and 321*b* arranged in one arm and phase shifters 322*a* and 322*b* arranged in the other arm are unified to 4L.

In the sub-segment 33, similarly, four phase shifters are provided in each arm with reference to 4L. The length of each of phase shifters 331*a* to 331*d* arranged in one arm and phase shifters 332*a* to 332*d* arranged in the other arm is 4L.

In the multilevel modulation segment 31 and the binary modulation segment 34, the length and the number of the phase shifters are set based on the unit length L and the value of the number m of bit of the multilevel modulation segment 31, and the operation bandwidth is uniformized.

In each of the sub-segments 32 and 33 of the binary modulation segment 34, the phase shifter length assumed for the uppermost bit of the m bits allocated to the multilevel modulation segment 31 is used as a reference. An increase in the number of the phase shifters arranged in each arm may be suppressed, and the phase shifters may be operated at the same operation speed. This concept of the phase shifter length is applied regardless of the value of m and the value of n.

Next, a driver configuration in each segment will be described. In the above description, in the multilevel modulation segment and the binary modulation segment, the length and the number of the phase shifters are optimized based on the same reference. In order to further enhance the uniformity of the operation bandwidth between the multilevel modulation segment and the binary modulation segment, a configuration of a driver final stage closest to the phase shifter is shared.

Figure 6:
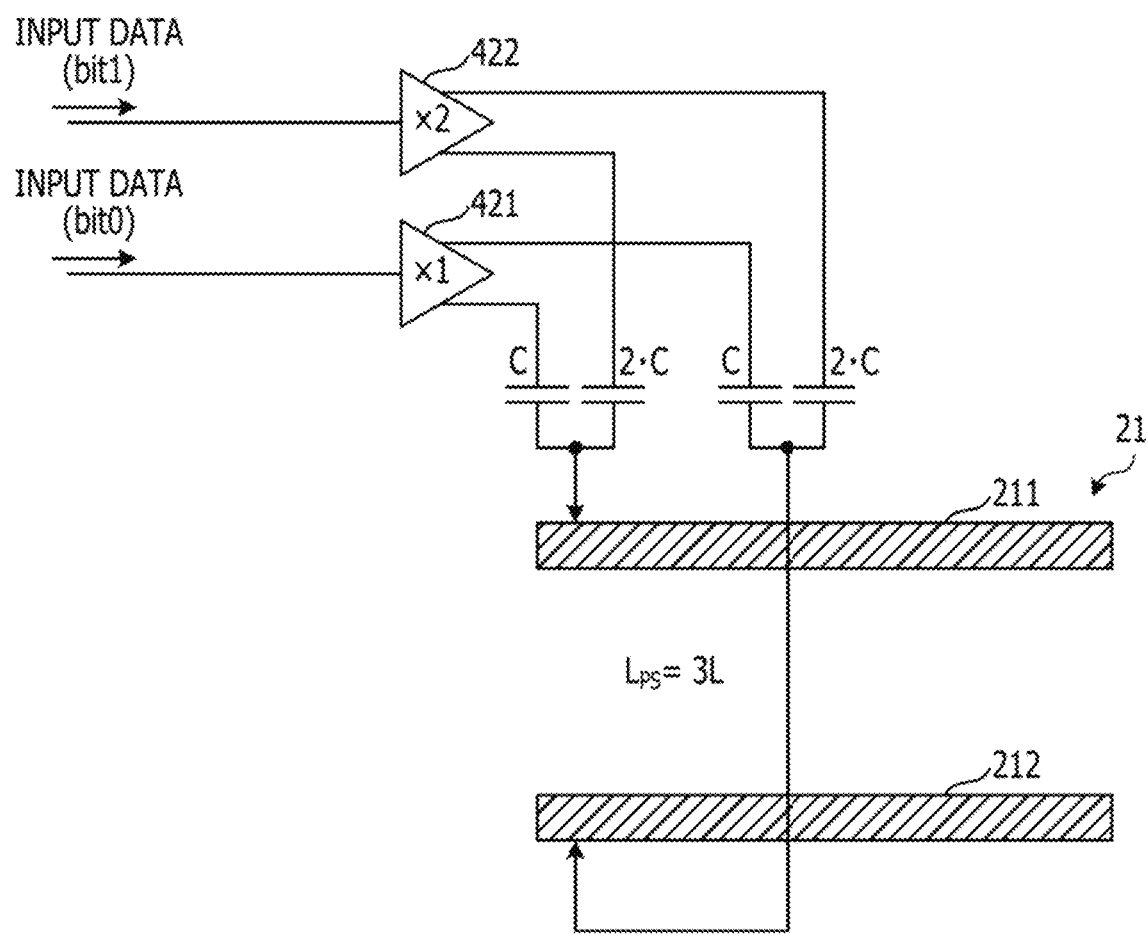
FIG. 6 is an example of a driving configuration of a multilevel modulation segment of the optical modulator.

FIG. 6 illustrates a driving configuration example of the multilevel modulation segment 21. This driving configuration is based on a configuration of the optical modulator 20 of FIG. 3. A phase shifter length $L_{PS}$ corresponding to the length of the phase shifters 211 and 212 is set to 3L (L is a unit length), and multilevel modulation encoded by two bits (bit 0 and bit 1) is performed.

A driver 421 corresponding to bit 0 and a driver 422 corresponding to bit 1 are weighted in driving capability in proportion to the weight of the bit. As an example of the weighting of the driving capability, the size of a driver formed in a CMOS is changed. The size of the driver 422 of bit 1 is set to 2 times the size of the driver 421 of bit 0.

High driver capability (large driver size) may be rephrased as small driver output impedance. The output impedances weighted in inverse proportion to the weight of the bit are set in the drivers 421 and 422.

A capacitor is coupled between each of the drivers 421 and 422 and the phase shifters 211 and 212. The capacitor is weighted according to the weight of the bit. A capacitor C is inserted between a first output of the driver 421 and the phase shifter 211, and the capacitor C is inserted between a second output (inverted output) of the driver 421 and the phase shifter 212. A capacitor 2C is inserted between a first output of the driver 422 and the phase shifter 211, and the capacitor 2C is inserted between a second output (inverted output) of the driver 422 and the phase shifter 212.

Bit 0 and bit 1 constituting a part of a transmission data string are input to corresponding drivers 421 and 422, respectively. The first output of the driver 421 and the first output of the driver 422 are combined by the capacitor C and the capacitor 2C and are input to the phase shifter 211 as a first multilevel signal.

The second output of the driver 421 and the second output of the driver 422 are combined by the capacitor C and the capacitor 2C and are input to the phase shifter 212 as a second multilevel signal.

The phase shifters 211 and 212 modulate the phase of light propagating through an MZ waveguide according to the input multilevel signal. A phase change φ(t) of the light of the entire multilevel modulation segment 21, which is modulated via the phase shifters 211 and 212, is set by $\varphi(t)=2^1 \cdot \text{bit } 1(t)+2^0 \cdot \text{bit } 0(t)$.

Figure 7:
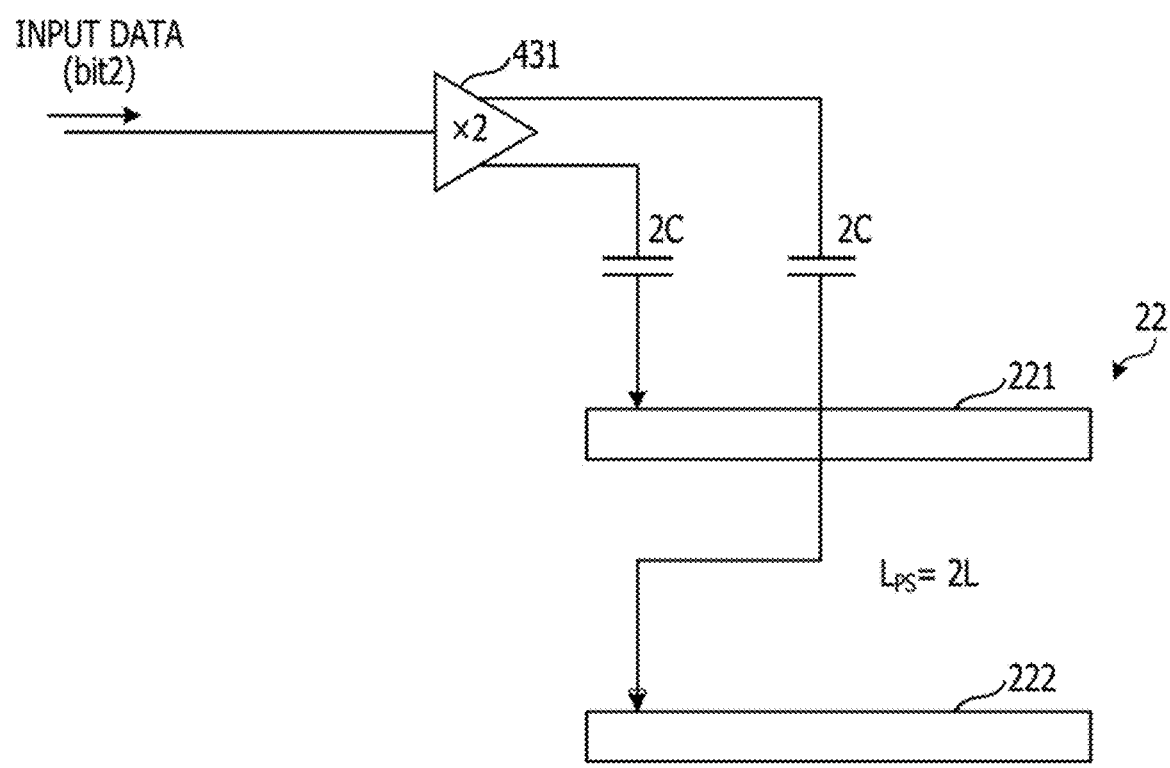
FIG. 7 is an example of a driving configuration of a binary modulation segment of the optical modulator.

FIG. 7 is an example of a driving configuration of each phase shifter of the binary modulation segment 24 of the optical modulator 20. In the binary modulation segment 24, the sub-segment 22 and the sub-segment 23 have the same configuration of the final driver 42 (see FIG. 3). Although the arrangement of the pre-stage pre-driver 41 differs depending on the number of the phase shifters used in the sub-segment 22 and the sub-segment 23, all the final drivers 42 have the same configuration.

Although FIG. 7 is focused on the driving configuration of the pair of phase shifters 221 and 222 in the sub-segment 22 to which bit 2 is input, the other phase shifter pairs in the sub-segment 22 and the respective phase shifter pairs in the sub-segment 23 to which bit 3 is input all have the same driving configuration.

The electrical signal representing the logical value of bit 2 is finally input to driver 431. The minimum driver output impedance in the multilevel modulation segment 21, for example, the maximum driving capability (driver size), is set for the driver 431. This is because the phase shifters 221 and 222 are set to the phase shifter length corresponding to the uppermost bit of the allocated m bits when it is assumed that the multilevel modulation segment 21 is not integrated.

A capacitor 2C is coupled between one output of the driver 431 and the phase shifter 211 and between the other output (inverted output) of the driver 431 and the phase shifter 212. The capacitor 2C is a value corresponding to the weight of the uppermost bit of the multilevel modulation segment 21.

The phase shifters 221 and 222 modulate the phase of the light propagating through the MZ waveguide according to the input binary signal.

Thus, each driver configuration of the binary modulation segment is the same as the driver configuration handling the uppermost bit of the multilevel modulation segment. Accordingly, the operation bandwidth may be uniformized between the multilevel modulation segment and the binary modulation segment.

A delay difference according to the speed of the light propagating through the MZ waveguide is provided between a timing of the driver signal input to the multilevel modulation segment 21 and a timing of the driver signal input to each segment of the binary modulation segment.

Figure 8:
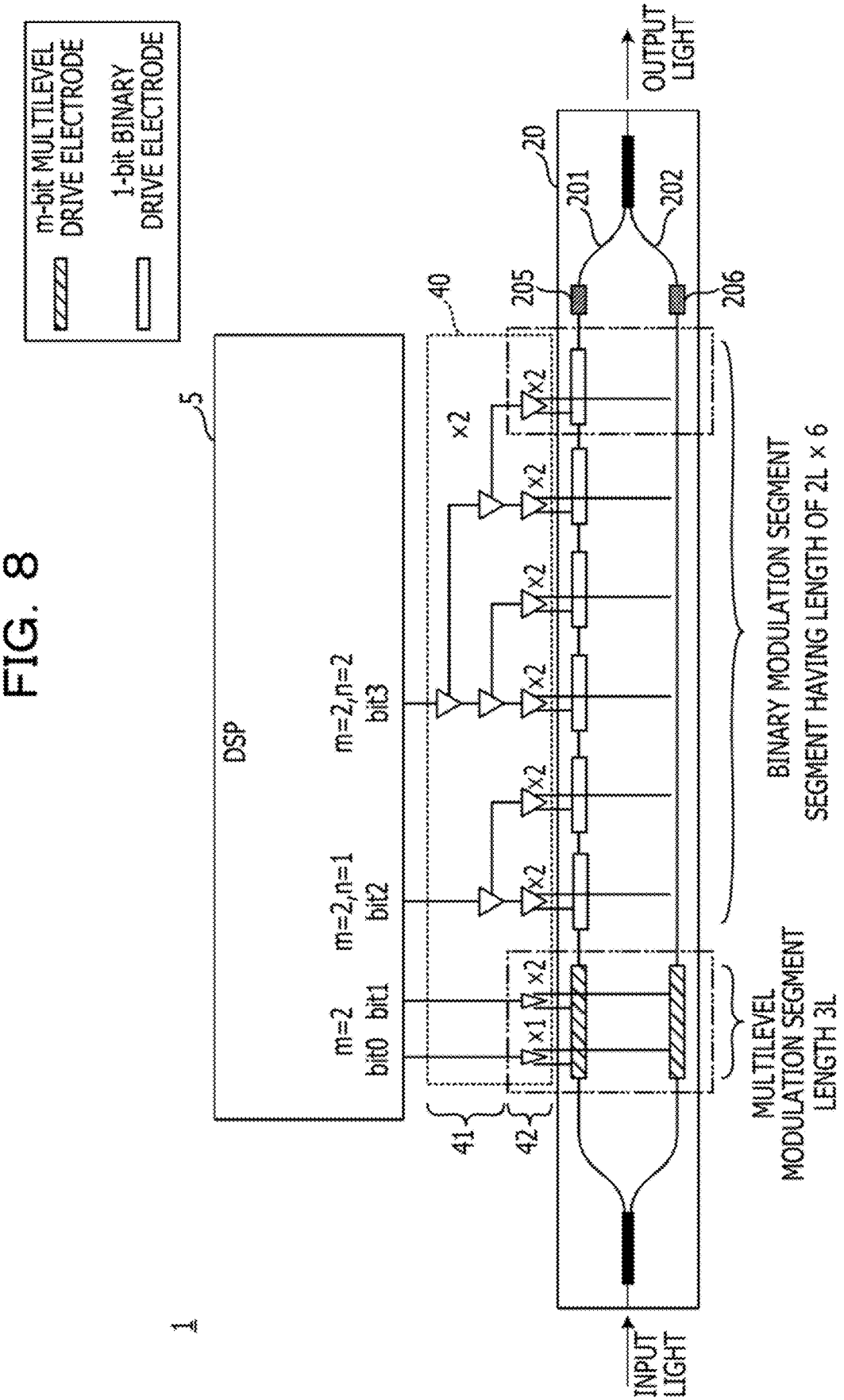
FIG. 8 is a diagram for explaining a model of the optical transmitter used for calculating an output waveform.

FIG. 8 is a diagram for explaining a model of the optical transmitter according to the embodiment used for calculating an output waveform. The DSP 5 outputs a 4-bit digital signal of m=2 and n=2. The unit length of each segment of the optical modulator 20 is set as 250 μm. The length 3L of the phase shifter of the multilevel modulation segment is 750 μm. The binary modulation segment is set to 2L×6 segments, for example, 500 μm×6 segments.

In a portion of the driver circuit 40 that handles bit 2, an output of the first stage pre-driver 41 is coupled to an input of the final stage final driver 42. The portion handling bit 2 has a three-stage tree structure, and digital electrical signals are finally input to four final drivers.

A delay time corresponding to an optical propagation time between segments is set at the output of the final driver 42. Low-speed phase adjusters 205 and 206 for optimally controlling an operation point of the modulator or a phase state of the propagation light are provided in each arm of the MZ waveguide. The phase adjusters 205 and 206 may be implemented by bias electrodes to which a DC bias for phase adjustment is applied.

Figure 9:
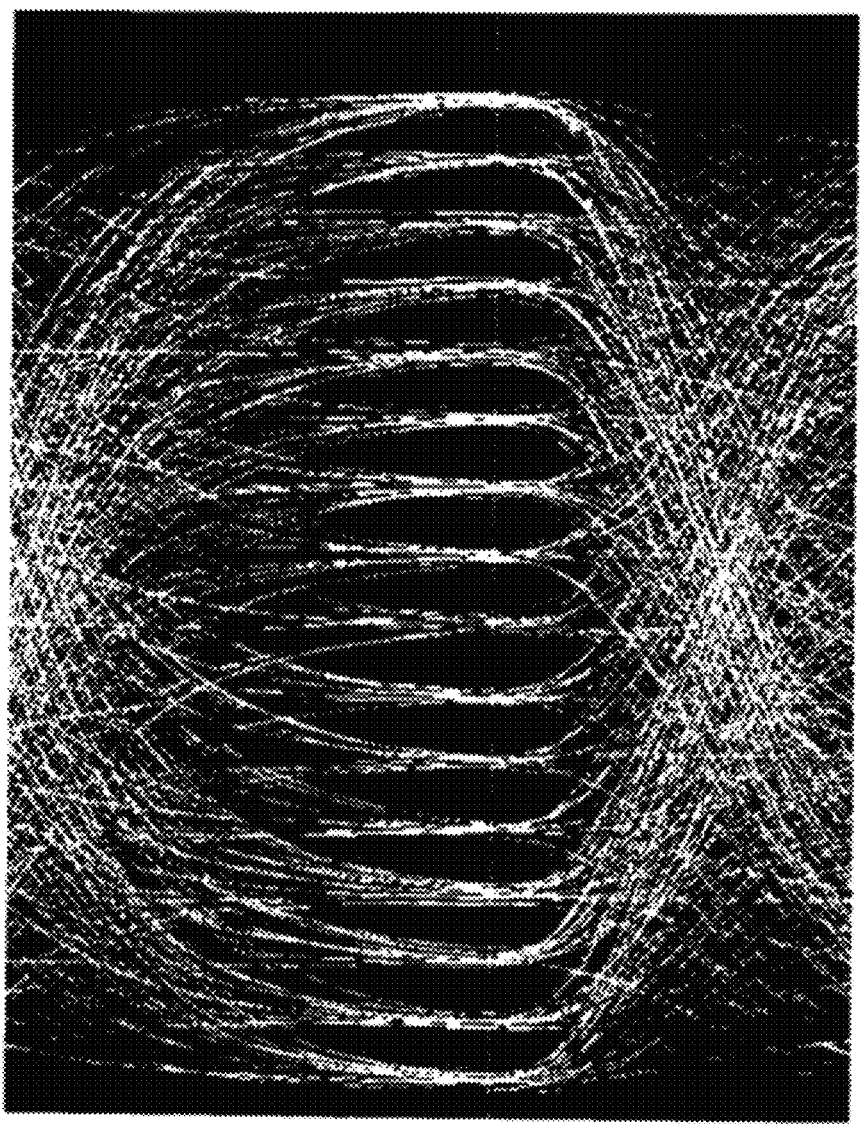
FIG. 9 is an output waveform diagram according to the model of FIG. 8.

FIG. 9 is an output waveform diagram according to the model of FIG. 8. An output optical signal having four bits (16 values) is calculated at a baud rate of 25 Gbaud. By applying the configuration of the embodiment, a substantially uniform eye opening is obtained between levels.

Figure 10A:
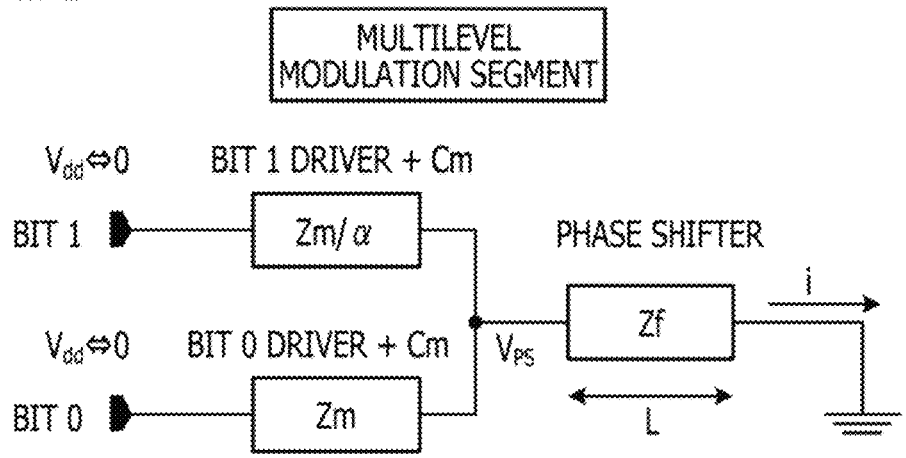
FIG. 10A is a diagram for explaining an operation band of a multilevel modulation segment.
Figure 10B:
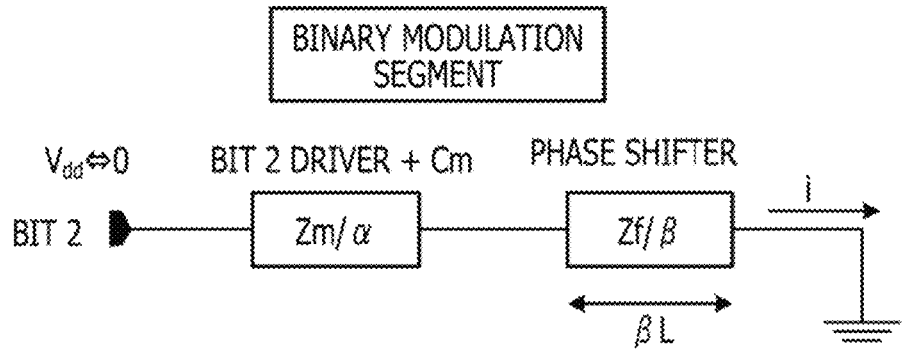
FIG. 10B is a diagram for explaining an operation band of a binary modulation segment.

FIG. 10A is a diagram for explaining the operation bandwidth of the multilevel modulation segment 21. FIG. 10B is a diagram for explaining the operation bandwidth of the binary modulation segment. In FIG. 10A, for example, bit 0 and bit 1 are input to the multilevel modulation segment. Bit 0 is set as an LSB and bit 1 is set as an MSB. Each bit has two values of VW and 0 V, and a two-bit binary signal has four values.

The output impedance set in the driver of 0 bit is Zm, and the output impedance set in the driver of 1 bit is set as Zm/α. When m=2, $\alpha=2^{m-1}=2$, and the driver impedance of bit 1 is a half of the driver output impedance of bit 0. The impedance of the phase shifter having a length L (for example, L is 3 times the unit length) is set as Zf.

When the logical values of both the MSB and the LSB are "0", 0 V is applied to both drivers, and a current i flowing through the phase shifter becomes zero.

When the logical values of both the MSB and the LSB are "1", the total impedance is the sum of the impedance of the portion to which the driver is coupled in parallel and the impedance Zf of the phase shifter coupled in series thereto, and is $[Zm+(1+\alpha)Zf]/(1+\alpha)$. Therefore, the flowing current i is $V_{DD}\times(1+\alpha)/[Zm+(1+\alpha)Zf]$.

When the logical value of the MSB is "0" and the logical value of the LSB is "1", the current i is $V_{DD}\times1/[Zm+(1+\alpha)Zf]$.

When the logical value of the MSB is "1" and the logical value of the LSB is "0", the current i is $V_{DD}\times\alpha/[Zm+(1+\alpha)Zf]$.

In FIG. 10B, each bit of the binary modulation segment, for example, bit 2, has two values of $V_{DD}$ and 0 V. The output impedance set in the driver of bit 2 is Zm/α, which is the minimum impedance in the multilevel modulation segment.

The length of each phase shifter in the binary modulation segment is weighted according to a value of m in the multilevel modulation segment. For example, when m=2, the phase shifter length of the multilevel modulation segment is ⅔ times. When this weighting is β, the impedance is Zf/β. The total impedance of the driver and the phase shifter is Zm/α+Zf/β.

When an input value of bit 2 is 0, 0 V is applied to the driver and the flowing current i is zero. When the input value of bit 2 is 1, $V_{DD}$ is input, and the amount of the flowing current is $V_{DD}/(Zm/\alpha+Zf/\beta)=V_{DD}\times\alpha/[Zm+(\alpha/\beta)Zf]$.

In an example of m=2, when α=2 and β=⅔ are set, the impedance component of the denominator of the current i flowing in the multilevel modulation segment is $[Zm+(1+\alpha)Zf]=Zm+3Zf$. The impedance component of the denominator of the current i flowing in each segment of the binary modulation segment is $[Zm+(\alpha/\beta)Zf]=Zm+3Zf$.

The analog bandwidths (operation bandwidths) of all the segments of the optical modulator 20 become equal.

Figure 11:
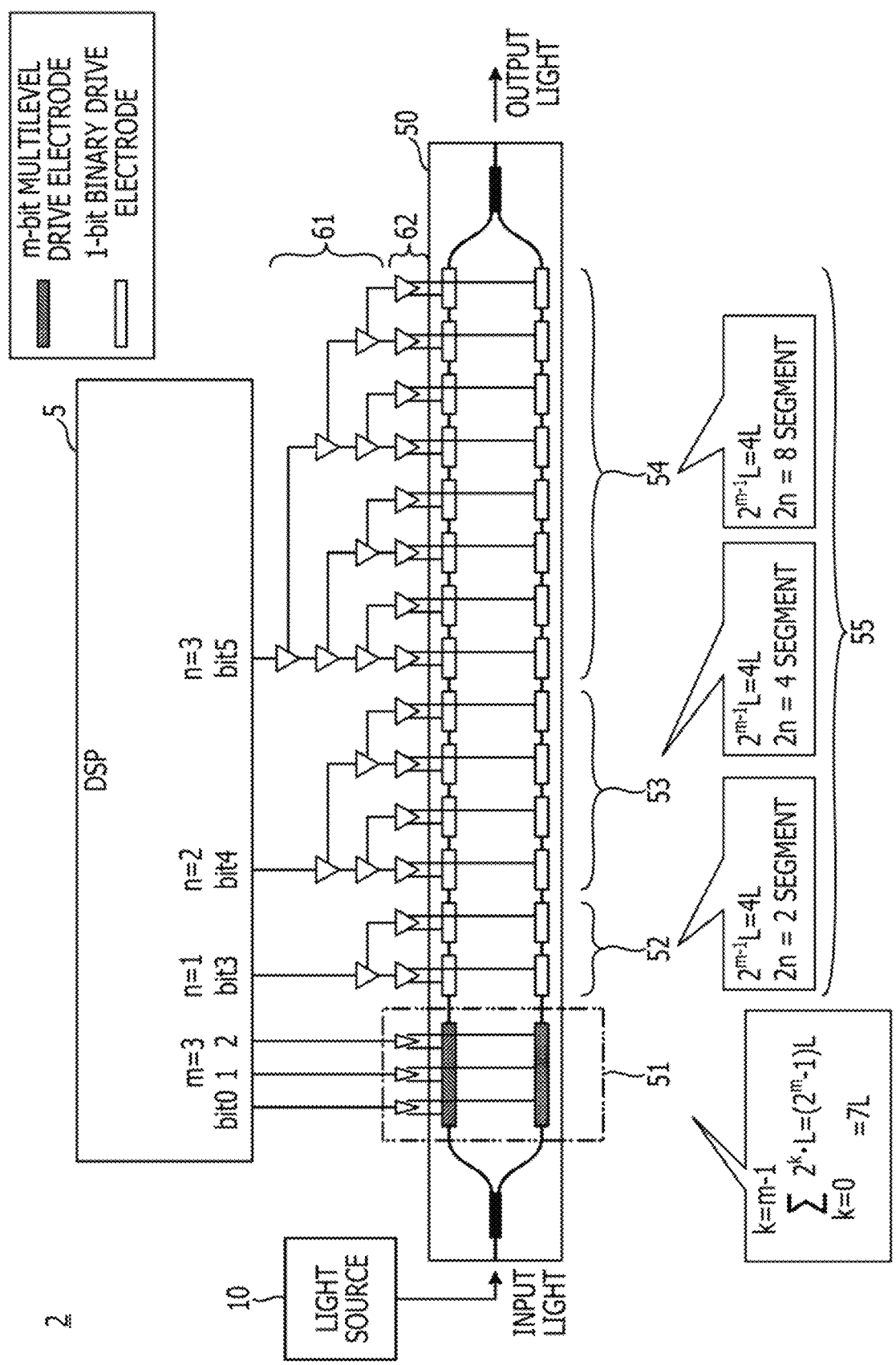
FIG. 11 is a schematic view illustrating the optical modulator when m=3 and n=3.

FIG. 11 is a schematic view of an optical transmitter 2 using an optical modulator 50 when m=3 and n=3. The optical modulator 50 has a multilevel modulation segment 51 which is multilevel-modulated with two or more bits and a binary modulation segment 55 which is binary-modulated for each one bit. The binary modulation segment 24 has sub-segments 52, 53, and 54 depending on the number of bits to be binary-modulated. In an example of FIG. 11, the number m of multilevel modulation bits is 3 (m=3), the number n of binary modulation bits is 3 (n=3), and an optical signal of 6 bits per one symbol is transmitted.

The multilevel modulation segment 51 is driven by an electrical signal having eight values by bit 0, bit 1, and bit 2. The sub-segment 52 of the binary modulation segment 55 is driven by an electrical signal of bit 3, the sub-segment 53 is driven by an electrical signal of bit 4, and the sub-segment 54 is driven by an electrical signal of bit 5.

The lengths of the one-bit binary drive electrodes serving as the phase shifters provided in the binary modulation segment 55 are all equal to each other and are shorter than the lengths of the multilevel drive electrodes serving as phase shifters provided in the multilevel modulation segment 51.

Figure 12:
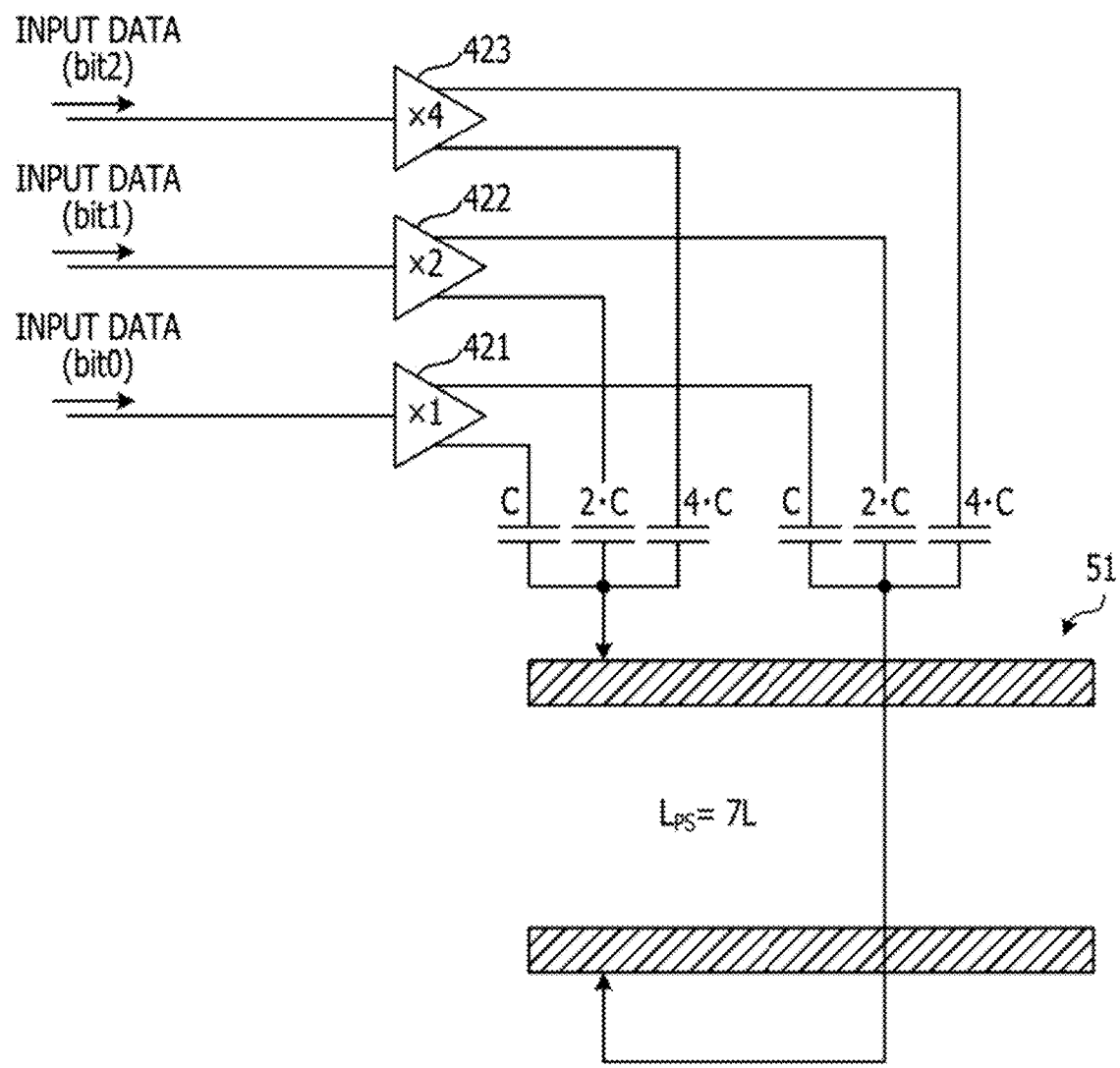
FIG. 12 is an example of a driving configuration of a multilevel modulation segment of the optical modulator of FIG. 11.

When the unit length of the phase shifter is L, if m=3 and n=3 as illustrated in FIG. 12, the length of the phase shifter of the multilevel modulation segment 51 is 7 (=1L+2L+4L). The length of each phase shifter of the binary modulation segment 55 is 4L in accordance with the phase shifter length of a portion corresponding to the uppermost bit of the multilevel modulation segment 51.

In the sub-segment 52 of the binary modulation segment 55 driven by bit 3, two phase shifters having a length of 4L are arranged in columns along each arm of an MZ modulator. In the sub-segment 53 driven by bit 4, four phase shifters having a length 4L are arranged in columns along each arm. In the sub-segment 54 driven by bit 5, eight phase shifters having a length of 4L are arranged in columns along each arm.

With such arrangement of the phase shifters, the lengths of the phase shifters are optimized in the multilevel modulation segment 51 and the binary modulation segment 55, so that the operation bandwidths of the multilevel modulation segment 51 and the binary modulation segment 55 may be uniformized. Even when the multilevel becomes high, an increase in the total number of the phase shifters may be suppressed.

FIG. 12 is an example of a driving configuration of the multilevel modulation segment 51. This driving configuration is based on the configuration of the optical modulator 50 of FIG. 11. The phase shifter length $L_{PS}$ of the multilevel modulation segment 51 is set to 7L (L is a unit length) and multilevel modulation encoded by 3 bits (bit 0, bit 1, bit 2) is performed.

In the driver 421 corresponding to the bit 0, the driver 422 corresponding to the bit 1, and a driver 423 corresponding to the bit 2, the driving capability is weighted in proportion to the weight of the bit. As an example of the weighting of the driving capability, the size of the driver formed by the CMOS is made different. The size of the driver 422 of bit 1 is set to 2 times the size of the driver 421 of bit 0. The size of the driver 423 of bit 2 is set to 4 times the size of the driver 421 of bit 0. This means that an output impedance weighted in inverse proportion to the weight of the bit is set in the drivers 421 to 423.

A capacitor is coupled between each of the drivers 421 to 423 and the phase shifter. The capacitor is weighted according to the weight of the bit. A capacitor C is inserted between an output of the driver 421 and the phase shifter. A capacitor 2C is inserted between an output of the driver 422 and the phase shifter. A capacitor 4C is inserted between an output of the driver 423 and the phase shifter.

A first output of the driver 421, a first output of the driver 422, and a first output of the driver 423 are combined with the capacitor C, the capacitor 2C, and the capacitor 4C and are input to one phase shifter as a first multilevel signal. A second output of the driver 421, a second output of the driver 422, and a second output of the driver 423 are combined with the capacitor C, the capacitor 2C, and the capacitor 4C and are input to the other phase shifter as a second multilevel signal. The pair of phase shifters modulate the phase of light propagating through the MZ waveguide according to the input multilevel signal.

The driving configuration of each phase shifter of the binary modulation segment 55 of the optical modulator 50 is the same as the configuration of FIG. 7 except for the weighting set in the driver 431, the coupled capacitor, and the length $L_{PS}$ of the phase shifter. In the optical transmitter 2, the weighting of the driver and the capacitor are multiplied by 4 according to the uppermost bit of the multilevel modulation segment 51. The length $L_{PS}$ of each phase shifter of the binary modulation segment 55 is set to 4L.

With this configuration, the operation bandwidths of the respective segments of the multilevel modulation segment 51 and the binary modulation segment 55 are matched, and the waveform deterioration of the output optical signal is suppressed.

Figure 13:
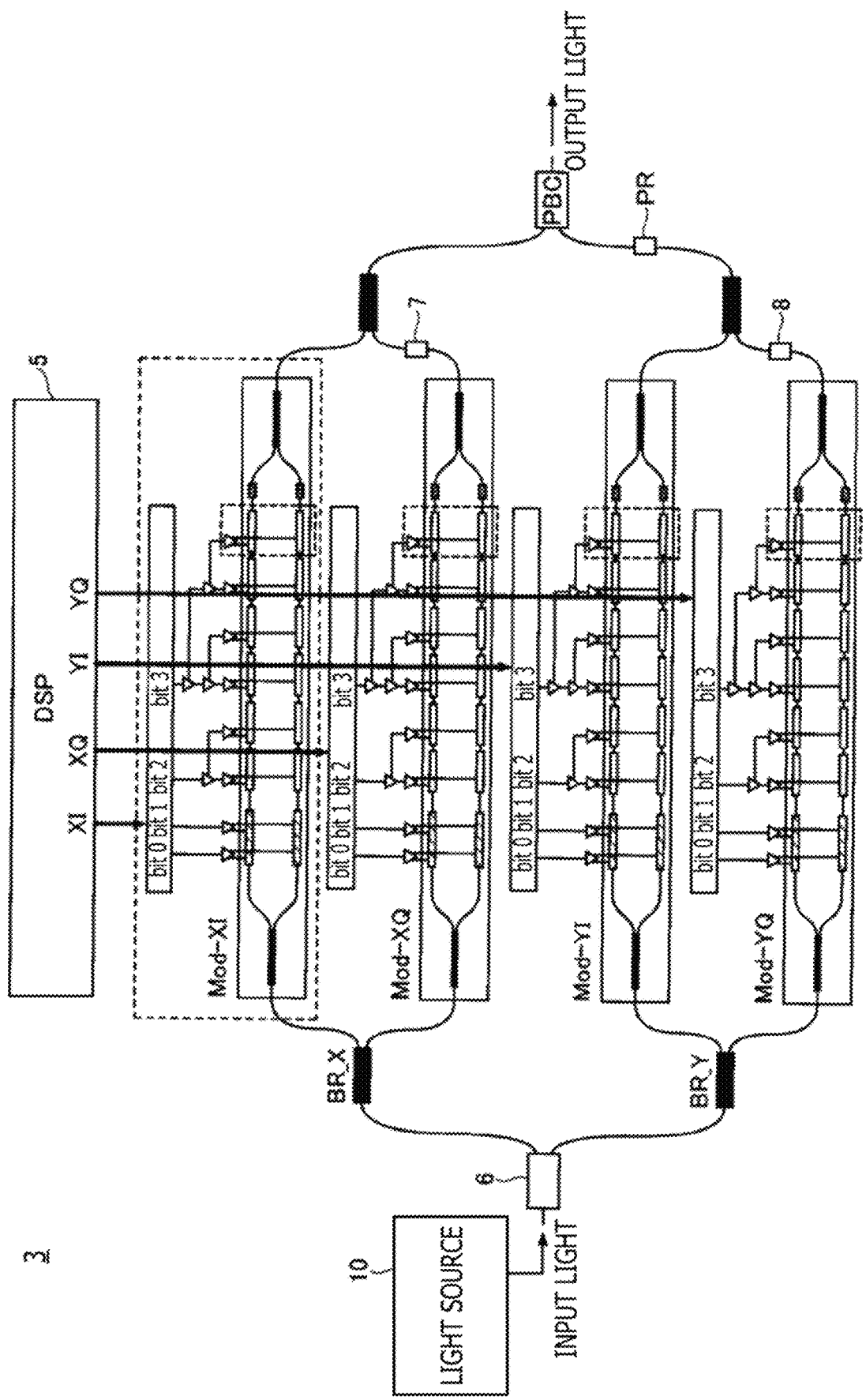
FIG. 13 is a diagram illustrating an application example to an IQ modulator.

FIG. 13 illustrates an application example of the configuration of the embodiment to an IQ modulator. An optical transmitter 3 is applied to, for example, multilevel modulation using a polarized wave multiplexing scheme, and includes an XI modulator (Mod-XI), an XQ modulator (Mod-XQ), a YI modulator (Mod-YI), and a YQ modulator (Mod-YI). Each modulator has the same configuration as that of the optical modulator 20 of FIG. 3, and performs optical modulation of a value of a maximum 256 quadrature amplitude modulation (QAM) scheme having 16 levels corresponding to four bits (refer to FIG. 9).

A 90-degree phase shifter 7 for providing a phase difference of 90 degrees is disposed between the XI modulator (Mod-XI) and the XQ modulation region (Mod-XQ). A 90-degree phase shifter 8 for providing a phase difference of 90 degrees is disposed between the YI modulator (Mod-YI) and the YQ modulation region (Mod-YQ).

By combining an output of the XI modulator and an output of the XQ modulation region having a phase difference of 90 degrees, an optical modulation signal having a value of 16×16 on the complex plane is generated. By using two polarized waves orthogonal to each other, the amount of information may be further increased by two times.

In each of the XI modulator (Mod-XI), the XQ modulator (Mod-XQ), the YI modulator (Mod-YI), and the YQ modulator (Mod-YI), the operation bandwidth of the multilevel modulation segment and the operation bandwidth of the binary modulation segment for each bit are uniformized, and an optical waveform or an eye pattern is favorably maintained.

Figure 14:
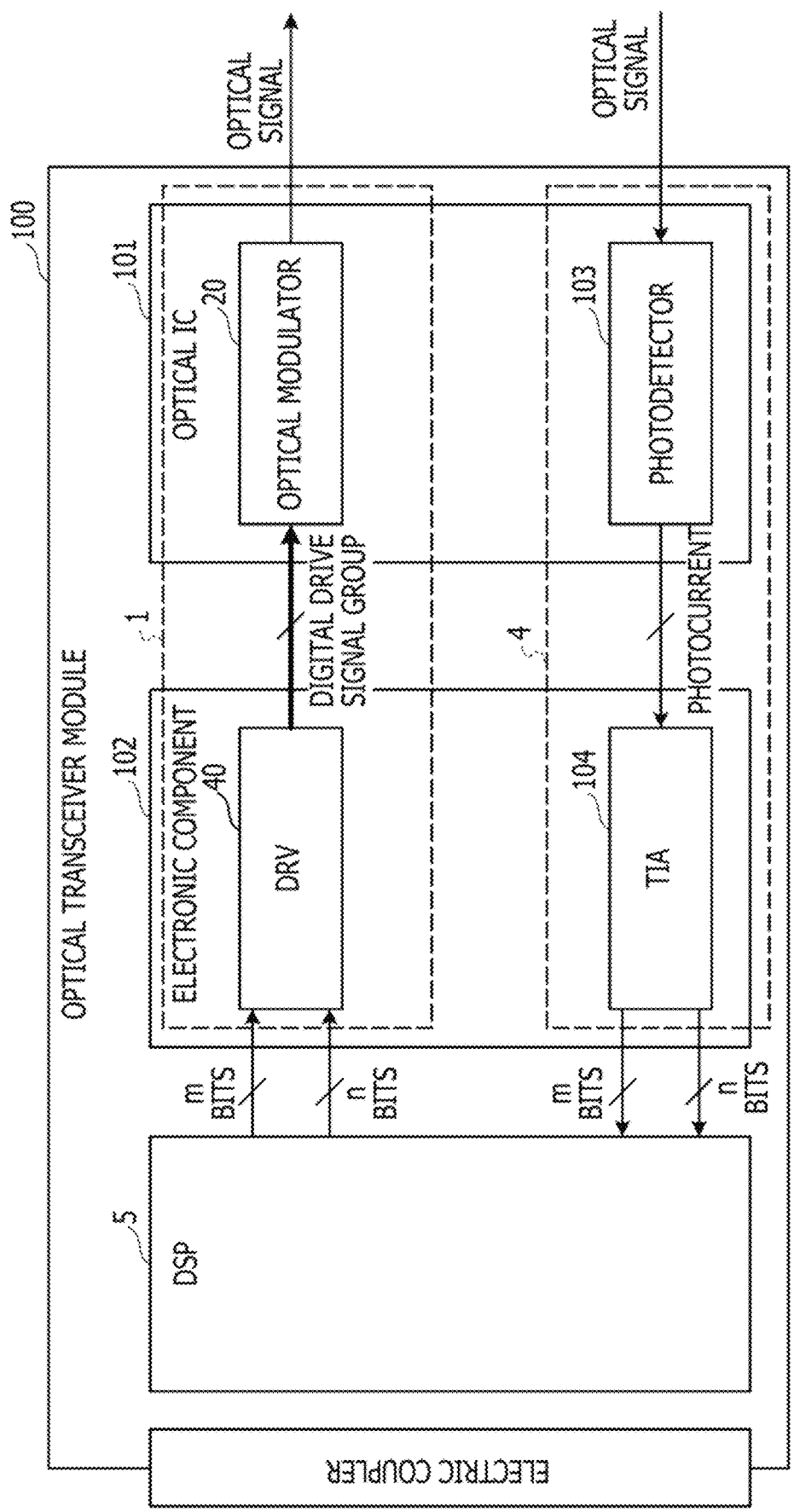
FIG. 14 is a schematic view illustrating an optical transceiver module using the optical transmitter according to the embodiment.

FIG. 14 is a schematic view of an optical transceiver module 100 using the optical transmitter 1 of the embodiment. The optical transceiver module 100 includes the optical transmitter 1, an optical receiver 4, and the DSP 5 in a package thereof.

For example, the optical transceiver module 100 includes an optical IC 101, an electronic component 102, and the DSP 5 in a package thereof. The DSP 5 side may have an electrical coupler for electrical coupling with another transmission device. Although not illustrated, an optical coupler for coupling to an optical fiber cable or the like may be provided on the optical IC 101 side.

In the optical IC, various optical circuit elements are integrated on a substrate using, for example, a silicon photonics technology. A beam splitter, a beam combiner, an optical coupler, a monitor PD, and the like in addition to the optical modulator 20 are integrated on the transmission side. A beam splitter, a 90 degree hybrid optical mixer, and the like in addition to a photodetector 103 may be formed on the reception side for digital coherent reception. In a case corresponding to the polarized wave multiplexing scheme, a polarization beam splitter, a polarization rotator, or the like may be formed.

The electronic component 102 includes the driver circuit 40 on the transmission side. The driver circuit 40 includes the pre-driver 41 and the final driver 42 (refer to FIG. 3). The final driver 42 is coupled to a plurality of phase shifters arranged at a predetermined length along the optical waveguide (arm) of the optical modulator 20, and is coupled to a predetermined capacitor. All the final driver drives each segment of the optical modulator 20 with the same circuit configuration.

An amplifier circuit including a transimpedance amplifier (TIA) that converts a photocurrent output from the photodetector 103 into a voltage signal is formed on the reception side of the electronic component 102.

The DSP 5 may be commonly used by the optical transmitter 1 and the optical receiver 4. The DSP 5 outputs an m-bit digital signal for the multilevel modulation segment and an n-bit digital signal for the binary modulation segment according to a configuration of the optical modulator 20.

When the optical transceiver module 100 incorporates the light source 10 (refer to FIG. 3), the output of the light source 10 is divided into two parts, one thereof is input to the optical modulator 20, and the other thereof is used as local oscillation light for detecting a received optical signal.

Although the optical transmitter 3 having the optical modulator 20 is used in FIG. 14, the optical transmitter 1 using the optical modulator 50 or the optical transmitter 2 of the polarized wave multiplexing scheme may be used. In any case, an optical transceiver module having a uniform operation bandwidth between the multilevel-modulated segment and the binary-modulated segment is implemented.

The present disclosure is not limited to the specific configuration example described above. For example, the driver circuit 40 may have a circuit configuration formed by bipolar transistors instead of the CMOS. The optical modulator may be an MZ modulator having, as a core, a multiple quantum well formed on an InP substrate instead of a waveguide of a silicon core. The present disclosure may also be applied to other modulator structures that do not have an MZ interferometer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device including a multi-division optical modulator having a plurality of modulation segments, the transmission device comprising:
a driver circuit configured to output binary data for each bit based on an input electrical signal; and
an optical modulator configured to have a multilevel modulation segment driven by a first drive signal including two or more bit signals from the driver circuit, and plural binary modulation segments driven by a second drive signal including only one bit signal from the driver circuit, wherein
the multilevel modulation segment includes a first phase shifter disposed on each arm of the optical modulator,
the binary modulation segment includes a plurality of second phase shifters arranged along each arm of the optical modulator, and
lengths of the second phase shifters are all the same and are shorter than a length of the first phase shifter.

2. The transmission device according to claim 1, wherein the driver circuit includes first circuit section driving the first phase shifter and second circuit section driving the second phase shifter, a first output impedance of the first circuit section being weighted in inverse proportion to bit weights of the input signal a second output impedance of the second circuit section being set to a minimum output impedance of the first output impedance of the first circuit section.

3. The transmission device according to claim 2, wherein the first circuit section and the first phase shifter are coupled to each other via first capacitor elements, and sizes of the first capacitor elements coupled to the first phase shifter are weighted in proportion to the bit weights of the input signal, and
the second circuit section and the second phase shifter are coupled to each other via a second capacitor, and the second capacitor is set to a maximum size among the capacitors coupled to the first phase shifter.

4. The transmission device according to claim 1, wherein when the number of bits included in the first drive signal is m and a unit length of the phase shifter is L, the length of the first phase shifter is $(2^m-1) \times L$, and the length of the second phase shifter is $2^{m-1} \times L$.

5. The transmission device according to claim 4, wherein when the total number of bits for the second drive signals is n (n=1, 2, . . . i, . . . n), the number of the second phase shifters included in an ith sub-segment of the binary modulation segment is $2^i$.

6. The transmission device according to claim 1, wherein the driver circuit includes a pre-driver receiving an input of the electrical signal and a final driver coupling to the first phase shifter and the second phase shifter, the final driver used for driving the binary modulation segment having the same driving configuration.

7. The transmission device according to claim 6, wherein a delay corresponding to an optical propagation time between the first phase shifter and the second phase shifters is set in the output of the final driver.

8. The transmission device according to claim 1, wherein the each arm is provided with a low-speed phase adjuster for adjusting an optical phase.

9. An optical transceiver module comprising:
an optical transmitter; and
a digital signal processor that outputs an electrical signal to the optical transmitter, wherein
the optical transmitter includes:
a driver circuit configured to output binary data for each bit based on the electrical signal; and
an optical modulator configured to have a multilevel modulation segment driven by a first drive signal including two or more bit signals from the driver circuit and plural binary modulation segments driven by a second drive signal including only one bit signal from the driver circuit,
the multilevel modulation segment includes a first phase shifter disposed on each arm of the optical modulator,
the binary modulation segment includes a plurality of second phase shifters arranged along each arm of the optical modulator, and
lengths of the second phase shifters are all the same and are shorter than a length of the first phase shifter.

10. The optical transceiver module according to claim 9, wherein
the driver circuit includes first circuit section driving the first phase shifter and second circuit section driving the second phase shifter, a first output impedance of the first circuit section being weighted in inverse proportion to bit weights of the input signal, a second output impedance of the second circuit section being set to a minimum output impedance of the first output impedance of the first circuit section.

11. The optical transceiver module according to claim 10, wherein
the first circuit section and the first phase shifter are coupled to each other via first capacitor elements, and size of the first capacitor elements coupled to the first phase shifter are weighted in proportion to the bit weights of the input signal, and
the second circuit section and the second phase shifter are coupled to each other via a second capacitor, and the second capacitor is set to a maximum size among the capacitors coupled to the first phase shifter.

12. The optical transceiver module according to claim 9, wherein
when the number of bits included in the first drive signal is m and a unit length of the phase shifter is L, the length of the first phase shifter is $(2^m-1) \times L$, and the length of the second phase shifter is $2^{m-1} \times L$.

13. The optical transceiver module according to claim 12, wherein
when the total number of bits for the second drive signal is n (n=1, 2, . . . i, . . . n), the number of the second phase shifters included in an ith sub-segment of the binary modulation segment is $2^i$.

14. An optical modulation method using a multi-division optical modulator having a plurality of modulation segments, the optical modulation method comprising:
generating binary data for each bit with a driver circuit based on an input electrical signal;
inputting a first drive signal including two or more bits among the generated binary data, to a multilevel modulation segment, and inputting one or more one-bit second drive signal among the generated binary data, to a binary modulation segment;
performing multilevel modulation of input light with the first drive signal by using a first phase shifter provided in the multilevel modulation segment; and
performing binary modulation of the input light with the one or more one-bit second drive signals by using a second phase shifter in each of one or more sub-segments of the binary modulation segment, wherein
the second phase shifters are all set to the same length in the binary modulation segment and are set to be shorter than a length of the first phase shifter.

15. The optical modulation method according to claim 14, wherein
the driver circuit includes first circuit section driving the first phase shifter and second circuit section driving the second phase shifter, a first output impedance of the first circuit section being weighted in inverse proportion to bit weights of the input signal, a second output impedance of the second circuit section being set to a minimum impedance of the first output impedance of the first circuit section.

16. The optical modulation method according to claim 15, wherein
the first circuit section is coupled to the first phase shifter via first capacitor elements, and size of the first capacitor elements coupled to the first phase shifter are weighted in proportion to the bit weights of the input signal, and
the second circuit section is coupled to the second phase shifter via a second capacitor, and the second capacitor is set to a maximum size among the capacitors coupled to the first phase shifter.

* * * * *